United States Patent

Suter

[15] 3,646,506
[45] Feb. 29, 1972

[54] SONIC DETECTION APPARATUS

[72] Inventor: Henry Suter, Hatboro, Pa.

[73] Assignee: The United States of America as represented by the Secretary of the Navy

[22] Filed: Apr. 9, 1970

[21] Appl. No.: 31,042

[52] U.S. Cl. ............................340/3 R, 340/3 D, 343/5 PD
[51] Int. Cl. ..................................................G01s 9/66
[58] Field of Search ....................340/3, 3 D, 1, 15; 343/5 PD

[56] References Cited

UNITED STATES PATENTS

| | | | |
|---|---|---|---|
| 3,121,856 | 2/1964 | Finney | 340/3 D |
| 3,383,678 | 5/1968 | Palmer | 343/5 PD |
| 3,394,342 | 7/1968 | Walker | 340/1 |

*Primary Examiner*—Richard A. Farley
*Attorney*—R. S. Sciascia and Henry Hansen

[57] ABSTRACT

An improved swimmer and floater detector having a sonic generator and receiver and a shift detector indicating the doppler frequency difference between the generated and received sonic waves within a guarded volume of flowing water. The shift detector output is passed to a plurality of adjacent narrow bandpass filters, each being connected via a respective gain-controlled amplifier to a common multiple frequency meter. The amplifier gain control is nonproportional to the output amplitude and is operative in two modes to steadily increase or decrease the gain when the output is below or above threshold respectively.

7 Claims, 1 Drawing Figure

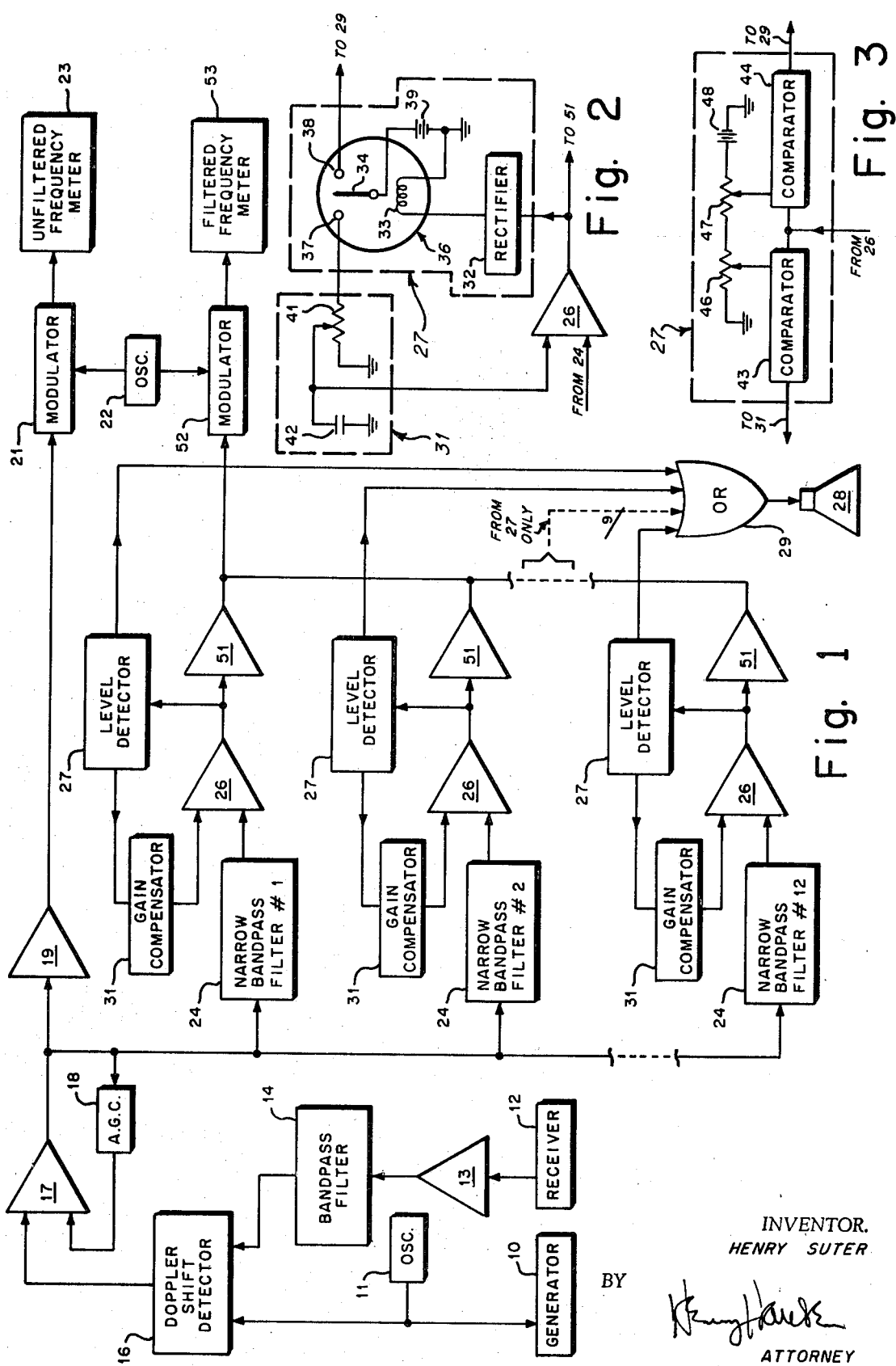

SONIC DETECTION APPARATUS

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

The invention relates generally to improvements in underwater detection systems, and more particularly to an improved, continuous wave, doppler sonar system having a gain compensation circuit for each bandpass filter.

In the past doppler sonar systems have been used in rivers for detecting the approach of swimming or floating objects to guard against sabotage of river installations. One type of equipment uses adjacent narrow bandpass filters to monitor the amplitudes of doppler shifts within certain frequency bands. Each band has an ambient level characteristic of the condition of the guarded volume with respect to stream velocity. The presence of a swimmer or floater causes an increase in amplitude over the ambient level in one or more bands. The frequency shift for swimmers is characteristically more pronounced than that associated with floating targets. If an alarm is to be triggered by an excess of activity within any band, it is important that the registered level be compared with ambient or nontarget conditions. With the prior equipment a steady change in stream velocity due to storm or tide necessitated frequent manual recalibration by trained personnel of the ambient levels in each band. Without such readjustment, increased stream velocity could trigger a false alarm. Moreover, each filtered band required its own amplitude meter. The size, weight and simultaneous readability of numerous meters seriously limited the number of discrete bandwidths which could be effectively monitored.

SUMMARY OF THE INVENTION

Accordingly, one of the objects of the invention is to improve the operating characteristics of the prior doppler swimmer detector by providing automatic adjustment of the bandpass filters to compensate for variations in the doppler frequency spectra caused by changes in the river velocity. Another object of the invention is to prevent accidental triggering of the alarm by gradual changes in the ambient level. A further object is to make the rate and direction of change in the gain of each amplified bandpass filter dependent only on whether a registered level is above or below threshold so that a steady rate of gain adjustment, nonproportional to the amplitude, is obtained. Still another object is to improve the display system for the outputs of the bandpass filters.

These and other objects of the invention are achieved by providing a continuous-wave, doppler sonar apparatus including a directional acoustic signal generator and receiver and a shift detector indicating the doppler frequency difference between the generated and received sonic waves. The shift detector output is fed to a plurality of adjacent narrow bandpass filters, each being connected via a respective gain-controlled amplifier to a common, multiple frequency meter. The amplifier gain control steadily increases or decreases the gain when the output is below or above threshold respectively.

BRIEF DESCRIPTION OF THE DRAWING

FIG. 1 is a block diagram of a doppler detection apparatus according to the invention;

FIG. 2 is a schematic and block diagram of a level detector and gain compensator of FIG. 1; and FIG. 3 is a schematic and block diagram of another embodiment of the level detector of FIG. 1.

DESCRIPTION OF THE PREFERRED EMBODIMENTS

Referring to FIG. 1 a directional, single tone, continuous-wave acoustic signal generator 10, driven by a 30 kHz. oscillator 11, provides the carrier signal which ensonifies the guarded volume of water (not shown). A directional acoustic signal receiver 12 receives reflected sonic waves originating from generator 10. The output of receiver 12 is fed via an audio amplifier 13 to a bandpass filter 14 having a center frequency preferably equal to that of the carrier signal and a bandwidth of about 200 Hz. so that the doppler-shifted signal spectra may be processed. The output of filter 14 is passed to a doppler shift detector 16 which is connected to oscillator 11 to utilize the original 30 kHz. carrier frequency as a reference signal. Detector 16 in effect subtracts the carrier signal from the received signal producing an output which includes the complex doppler shift spectra introduced by the moving medium and reflective targets. The output of detector 16 is applied to a broad bandpass, variable gain control, audio amplifier 17 having an automatic gain control loop 18 to compensate for shifts in the average ambient level throughout all frequencies in the output of detector 16. The effect of automatic gain control 18 is to hold the overall level of the signal constant without regard to any particular frequency band. A conventional gain control having a rate of change proportional to the amplitude would be satisfactory for this purpose.

The output of amplifier 17 is passed via amplifier 19 to a modulator 21 which mixes the unfiltered composite doppler signal with a 300 Hz. continuous-wave signal provided by an oscillator 22. The mixed output from modulator 21 is fed to a frequency meter 23 which is calibrated in velocity units such as knots. A suitable display device for meter 23 is a vibrating reed frequency meter which displays amplitude and frequency information. The range of doppler frequencies involved is typically about 7 to 85 Hz. For use with the vibrating reed-type meter, the range from minimum to maximum frequency should not span more than one octave. Moreover, low-frequency reeds are subject to mechanical vibration interference. Thus it is preferable to mix the composite signal with a higher frequency secondary signal to shift upwardly the frequency range applied to the meter. If oscillator 22 supplies a 300 Hz. signal, the sum frequency range would typically be 307 to 385 Hz. The information displayed on meter 23 represents both the river velocity, that is, the ambient level, and also swimming and floating targets which are within the guarded volume of water.

The output of amplifier 17 carrying the composite doppler shift frequencies is fed to a plurality of parallel narrow bandpass filters 24 having adjacent bandwidths. For example filter No. 1 may have a bandwidth of 5–10 Hz. and filter No. 2 a bandwidth of 10–15 Hz., the amplitudes passed by each filter being down 3 db. at the upper and lower ends of the respective bandwidths. The other filters, through, for example, No. 12, would have successive bandwidths to cover the normal range of doppler frequencies encountered. The output of each filter 24 is passed to a corresponding amplifier 26 having voltage-controlled variable gain. The output level of each amplifier 26 indicates the relative amplitude of acoustic signals within the band passed by the associated filter 24. For each band, a level detector 27 receives the output of amplifier 26. The twelve outputs of detectors 27, including those not shown, are fed to OR-gate 29 which energizes an alarm 28 whenever the amplitude within any filtered band exceeds a predetermined level. Detector 27 also regulates a gain compensator 31 to adjust the gain of amplifier 26. Amplifier 26, detector 27, and compensator 31 may be viewed together as forming a control circuit for the corresponding filter 24.

Detector 27 and compensator 31 are shown in more detail in FIG. 2. The output of amplifier 26 is passed to a rectifier 32 which supplies current to a coil 33 causing corresponding angular displacement of a pivoted pointer 34 in the meter 36. Meter 36 is furnished with adjustable contacts 37 and 38 corresponding to threshold and alarm level amplitudes respectively to the output of amplifier 26. Compensator 31 includes an RC circuit having a variable resistor 41 with one portion connected to ground and another portion connected in series with a grounded capacitor 42. When the output amplitude of amplifier 26 is so low that pointer 34 touches contact 37, an electrical connection is established between a source of DC voltage 39 and compensator 31 whereby resistor 41, capacitor 42 and DC source 39 form a series circuit. The lead supplying voltage to control the gain of amplifier 26 is connected at the junction of resistor 41 and capacitor 42. The voltage output of compensator 31 increases as capacitor 42 is charged. The charge rate may be varied in accordance with the RC time constant in a manner well know to those skilled in the art. A suitable time constant would be about 5 minutes, commensurate with the normally slow change in stream velocity. If contact between pointer 34 and contact 37 is broken by an increase in the output of amplifier 26, capacitor 42 will begin to discharge slowly through the grounded portion of resistor 41, thus reducing the voltage output from compensator 31 and decreasing the gain accordingly. The discharge rate of capacitor 42 is independent of the specific output amplitude of amplifier 26. Even for an alarm level signal within the associated band causing pointer 34 to touch contact 38, the gain decrease in amplifier 26 during discharge will be dependent only on the RC time constant of compensator 31. Contact 38 is connected to OR-gate 29 (FIG. 1). When pointer 34 meets contact 38, voltage is supplied by DC source 39 to activate alarm 28, indicating a predetermined alarm level within at least one filtered band.

Another arrangement suitable for carrying out the function of level detector 27 is shown in FIG. 3. The output from amplifier 26 is fed to comparators 43 and 44 which may be biased transistors. Reference voltage for the comparators 43 and 44 is supplied by series-connected variable resistors 46 and 47 which divide the voltage from DC source 48. When the amplifier signal falls below the reference voltage of resistor 46, comparator 43 provides a voltage output to compensator 31 through resistor 41 which increases the gain by charging capacitor 42. Comparator 44 likewise provides an output voltage to OR-gate 29 when the output of amplifier 26 exceeds the alarm level established by resistor 47.

Referring to FIG. 1 the outputs of amplifiers 26 are passed via corresponding isolation amplifiers 51 to modulator 52 which receives the composite spectra associated with each narrow bandpass filter 24. Modulator 52 is similar to modulator 21 and mixes the doppler shift frequencies with the higher frequency, secondary signal supplied by oscillator 22. A frequency meter 53 is connected to modulator 52 and receives and displays the doppler frequencies passed by filters 24. Like the meter 23, the filtered frequency meter 53 is calibrated in velocity units. A second reed frequency meter may be suitably employed for meter 53. If two reed meters are used, it is desirable to mount one immediately above the other to facilitate comparison.

In operation generator 10 and receiver 12 are laterally spaced on a river bottom and aimed along the direction of the primary current to establish a guarded volume of water. A river current produces an ambient doppler spectrum at the output of shift detector 16. At any given time the relative amplitudes for the frequencies within this spectrum vary. For a one-knot current, the maximum amplitude will typically occur at 20 Hz. The shape of the amplitude vs. frequency spectrum will always be faithfully reproduced by meter 23 because its input is unfiltered. Under the same ambient conditions, the input to meter 53 will contain the same frequency spectrum, but the amplitudes for each frequency will be approximately equal; no maximum amplitude peak will be present at ambient levels.

Constant amplitude throughout the ambient spectrum is established and enforced by automatic compensation of the gain on each amplified filter when the contacts 37 within level detectors 27 are set for the same threshold. Assuming no target objects are present and the river velocity is constant, the pointer 34 will undergo small fluctuations frequently touching threshold contact 37. Due to compensator 31, the gain on amplifier 26 will be in a constant state of flux, either decreasing or increasing. When the output of the amplifier 26 is low enough for pointer 34 to touch contact 37, the gain will be slowly increased until pointer 34 breaks contact with contact 37. However, when pointer 34 is not completing the compensator circuit, the gain on amplifier 26 will be decreasing due to the discharge of capacitor 42. Thus, pointer 34 will intermittently fall back to contact 37. With an increase in stream velocity, the ambient level represented by the output of amplifier 26 will rise forcing pointer 34 to an intermediate position within meter 36. At the same time compensator 31 will be decreasing the gain to bring pointer 34 back into intermittent touching of contact 37.

If the current decreased from one knot to one-half knot, the corresponding peak doppler frequency on meter 23 would decrease from 20 to 10 Hz. As a result, the output of the filter associated with 20 Hz. would decrease. If the gain on the associated filter amplifier 26 were not increased, doppler signals within the band from true targets might fail to be of sufficient amplitude to sound the alarm. If instead the current rose from one to two knots, the corresponding peak would shift to 40 Hz. The output of the filter handling 40 Hz. would be increased to the extent that small increments in ambient level might trigger a false alarm. Therefore, the gain should be reduced to bring the ambient level of the affected filter back into agreement with the other filter outputs.

In conventional gain controls, the rate of change of the gain is proportional to the amplitude of the output signal. This type of gain control was found unsatisfactory for use with filter amplifiers 26 since rapidly reducing the gain might prevent a true target signal from reaching the alarm level. In the system of FIG. 1, however, when a moving reflecting object enters the ensonified volume, the affected filter output rises much more rapidly than the associated gain compensator 31 can follow, thus allowing the amplitude to obtain the alarm level. By constantly correcting the ambient output level within each band to maintain a predetermined threshold, a fixed relationship between ambient conditions and the alarm level is assured thus, in effect, normalizing the sensitivity of each doppler filter over the full range of ambient conditions.

The number of narrow bandpass filters employed can be varied up to any practicable number depending on the selectivity desired. Compensator 31 and detector 27 are not limited to use in swimmer and floater detectors. They are inherently useful in any device which must detect the occurrence of transient amplitudes which bear a fixed relationship to a steadily changing ambient level.

The improved swimmer and floater detector frees sentries from the task of continuously monitoring the ambient levels within each filtered band. Manual adjustment during operation is unnecessary due to the normalizing effect of gain compensator 31 and detector 27. In addition, the use of a single filtered frequency meter for display permits adjacent location with the unfiltered display for simple comparison and enables direct reading of the actual doppler frequencies produced.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A doppler sonar detection apparatus of the type comprising an acoustic generator, an acoustic receiver, a doppler shift detector which compares the frequency of the generated waves with that of the received waves and produces an output indicative of the doppler shift, and a plurality of bandpass filters operatively connected in parallel to the shift detector for passing respective bandwidths of the shift detector output, wherein the improvement comprises a plurality of control circuits, each one of which is connected to a corresponding one of the bandpass filters and includes:

a voltage-controlled, variable gain amplifier having two input terminals one of which is connected to a corresponding filter for amplifying the output thereof;

level detector means connected to receive the amplifier output for providing a voltage at a first output terminal when the amplifier output is below a first predetermined level; and gain compensator means connected to the level detector first output terminal for providing a continuously increasing or decreasing voltage to control the amplifier gain when the amplifier output is respectively below or above the first level, the compensator means being connected to the other amplifier input terminal.

2. The detection apparatus of claim 1 wherein:

the compensator means includes an RC circuit connected to the level detector first output terminal and receiving charging voltage therefrom, the RC circuit being connected to the other amplifier input terminal.

3. The detection apparatus of claim 2 wherein:

the RC circuit includes a capacitor connected in series through a junction to a resistor, the junction being connected to the other amplifier input terminal.

4. The detection apparatus of claim 2 wherein:

the level detector includes a second output terminal adapted to be connected to an external alarm for supplying voltage thereto when the amplifier output is above a second predetermined level.

5. The detection apparatus of claim 4 wherein:

the level detector comprises a meter having a pointer member whose displacement along a path corresponds to the level of the amplifier output, a voltage source connected to the pointer member, and first and second contact members located in the path at respective first and second positions corresponding respectively to the first and second predetermined levels, the first and second contact members being connected respectively to the first and second output terminals of the level detector, whereby voltage is supplied to the RC circuit or to the level detector second output terminal when the pointer member is in contact with the first or the second contact member respectively.

6. The detection apparatus of claim 4 wherein:

the level detector comprises first and second voltage reference sources corresponding respectively to the first and second predetermined levels, a first comparator means connected to the amplifier and receiving the output thereof and connected to the first reference source for providing the voltage at the first output terminal of the level detector when the amplifier output is below the first predetermined level, and a second comparator means connected to the amplifier and receiving the output thereof and connected to the second reference source for providing the voltage at the second output terminal of the level detector when the amplifier output exceeds the second predetermined level.

7. The detection apparatus of claim 4 wherein the improvement further comprises:

modulation means connected to each control circuit and operatively receiving the output of each amplifier therein for mixing the amplifier outputs with a secondary signal to form a composite signal having a plurality of frequencies, the frequency of the secondary signal being higher than the frequencies of the amplifier outputs; and a frequency meter connected to the modulation means and receiving the output thereof for simultaneously displaying the plurality of frequencies represented in the composite signal.

* * * * *